United States Patent
Deshpande et al.

(10) Patent No.: US 12,518,603 B2
(45) Date of Patent: Jan. 6, 2026

(54) DETECTION OF UNAUTHORIZED OBJECTS ON ATM

(71) Applicant: Bank of America Corporation, Charlotte, NC (US)

(72) Inventors: Nimish Deshpande, Mumbai (IN); Yash Misra, Lucknow (IN); Suman Boroi Tamuly, Assam (IN); Harender Dass, Haryana (IN); Prashant Bidkar, Delhi (IN); Ankit Upadhyaya, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/004,661

(22) Filed: Dec. 30, 2024

(65) Prior Publication Data
US 2025/0148882 A1 May 8, 2025

Related U.S. Application Data

(63) Continuation of application No. 18/243,198, filed on Sep. 7, 2023, now Pat. No. 12,217,580.

(51) Int. Cl.
*G07F 19/00* (2006.01)
(52) U.S. Cl.
CPC ........ *G07F 19/209* (2013.01); *G07F 19/2055* (2013.01)
(58) Field of Classification Search
CPC .......................... G07F 19/209; G07F 19/2055
USPC ........................................................ 235/379
See application file for complete search history.

(56) References Cited

U.S. PATENT DOCUMENTS

| | | | |
|---|---|---|---|
| 7,742,953 B2 | 6/2010 | King et al. |
| 8,944,317 B2 | 2/2015 | Lewis et al. |
| 9,038,891 B2 | 5/2015 | Lewis et al. |
| 9,203,548 B2 | 12/2015 | Ray et al. |
| 9,247,211 B2 | 1/2016 | Zhang et al. |
| 9,607,485 B2 | 3/2017 | Lewis et al. |
| 9,898,730 B2 | 2/2018 | Flitcroft et al. |
| 10,068,231 B2 | 9/2018 | Lewis et al. |
| 10,121,331 B1 | 11/2018 | Hodges et al. |
| 10,284,581 B2 | 5/2019 | Moradi et al. |
| 10,572,698 B1 | 2/2020 | Keener |
| 10,643,438 B1 | 5/2020 | Yang et al. |
| 10,936,928 B2 | 3/2021 | Scaife et al. |

(Continued)

OTHER PUBLICATIONS

Di, Haibin, et al., Developing a seismic texture analysis neural network for machine-aided seismic pattern recognition and classification; Geophysical Journal International; Advanced Access publication May 28, 2019; pp. 1262-1275.

*Primary Examiner* — Toan C Ly
(74) *Attorney, Agent, or Firm* — Banner & Witcoff, Ltd.

(57) ABSTRACT

Information-security LoRa-wave sensing is used to protect ATMs with LoRa modulator with spread-spectrum modulation techniques and/or transparent laser-guided systems 3D image generation to scan/monitor ATM card slots and ATM keypads for skimmers, fake keypads, etc. Sensor(s) with a DCNN/StNet-based algorithm are trained on 3D dimensions for card slot and keypad. Normal vs. detected constant weight of the keypad as well as weight distribution when keys are depressed are detected. Normal vs. disrupted signals based on the foregoing are observed and used to detect unauthorized objects. NB-IoT LoRa-waves initiate an alarm process. Additional features, functionality, and details are disclosed.

20 Claims, 7 Drawing Sheets

(56) References Cited

U.S. PATENT DOCUMENTS

| | | |
|---|---|---|
| 11,049,370 B2 | 6/2021 | Hodges |
| 11,132,875 B1 | 9/2021 | Wang et al. |
| 11,182,794 B1 | 11/2021 | Aument |
| 2006/0118624 A1 | 6/2006 | Kelso et al. |
| 2018/0046948 A1 | 2/2018 | Ray et al. |
| 2019/0246070 A1 | 8/2019 | Paliga et al. |

DETECTION OF UNAUTHORIZED OBJECTS ON ATM

This application is a continuation application of U.S. Ser. No. 18/243,198 filed on Sep. 7, 2023. The present application claims priority to and the benefit of the above-identified applications and the above-identified applications are incorporated by reference herein in their entirety.

TECHNICAL FIELD

The present disclosure relates to information security and, more particularly, to systems, processes, and apparatus for access control to prevent unauthorized access to resources of a system or information system, including the manner of verifying the entity, process, or mechanism requesting access to an automated teller machine (ATM) resource by detecting unauthorized objects in/on/around the ATM.

DESCRIPTION OF THE RELATED ART

The use of automated teller machines is linked to a variety of different threat vectors and security issues. ATM skimming and ATM shimming are examples of bank, debit, and/or card fraud.

Skimming refers to a type of fraud that occurs when a skimmer gains access to an ATM and steals data therefrom. Shimming is another term that can be used to refer to skimming. Shimming makes use of a small, flexible device that has a thickness of only 0.1-0.2 mm, in contrast to skimming, which makes use of bulky pads, making it impossible to see shimmers with the naked eye. Shimming is also known as micro-shimming. This is the primary distinction that can be made between the two shady approaches to conducting business.

Every year, fraudsters misappropriate large amounts from skimming the ATM's slot duplication and/or keypad duplication which are easy to conceal and can be used to rob users. One of the drawbacks most of the institutions face are due to: non-presence of security guards, non-presence of silo-based ATM's Poor detection and alarming systems, and fragile ATM machines in terms of production and security.

Criminals commit this type of fraud when they attach a device to an ATM that captures user information such as the identifying number, the expiration date, and the personal identification number (PIN). A skimmer can be a device that is placed over the magnetic/chip reader of the ATM. The skimming device records the number as well as other information when it detects that a card has been inserted into it. Once this information has been obtained, counterfeit cards that are capable of making cash withdrawals are created and used. These cards are then used by the criminal. It may be difficult to detect these devices and to carry out real-time monitoring of the internal components of the ATM as well as the physical phenomena that occur in close proximity to the machine or its components. Even if problems or potential problems are identified, there is no assurance that ATMs can be deactivated in real time, let alone remotely. This is the case even in the event that the problems are identified.

The term "skimmer" is commonly used in the context of the security industry to refer to any piece of hardware device that is capable of stealing information from payment cards. Skimmers can take the form of a card reader fitted with a chip, a miniature camera, or a fake keypad for entering a PIN code in order to steal sensitive information from cards. Both double-sided adhesive tape and fasteners can be used to secure skimmers to automated teller machines. A skimming device has the capability of altering the appearance of the keypad or the keys. For instance, if the keypad had a concave surface, the overlay will bring the panel up to a flatter level. It's possible that the keys are either too flush with the keyboard panel or too far out.

Overlays are devices that are placed over the keypad of an ATM, and their purpose is to read the PIN code that is entered by the owner of the bank card. It is possible to install fake keypads on top of the real keypad at an automated teller machine. As a consequence of this, the fake keyboard is able to remember the keys that have been typed and then transmit those keystrokes to the real keys. The ATM continues to respond normally, making it difficult to identify the switch. After that, the criminals steal the overlay, decipher the recording, and then use that to figure out the PIN number of the cardholder. Criminals are able to make a copy of the card by using the information that was stolen from it.

Black box hacking is carried out with the assistance of specialized hardware known as black boxes. These are single-board microcomputers that have been specifically programmed. The unauthorized individual breaks into the casing of the ATM after gaining access to the machine's interior. Once inside, he connects a device that compels the ATM to dispense all of the cash.

The foregoing has presented constant problems and there is a long felt need in the industry to address these problems better smart solutions to provide a substantially increased level of security for both users and cash contained in the ATMs.

SUMMARY OF THE INVENTION

In accordance with one or more arrangements of the non-limiting sample disclosures contained herein, solutions are disclosed to address one or more of the shortcomings in the field of information security in order to provide improved, real-time, monitoring, control, fraud prevention, and enhanced security for ATMs (including internal/external components thereof) in general by, inter alia, (a) using LoRa-wave sensing to protect ATMs with LoRa modulator with spread-spectrum modulation techniques and/or transparent laser-guided systems 3D image generation to scan/monitor ATM card slots and ATM keypads for skimmers, fake keypads, etc.; (b) utilizing sensor(s) with a DCNN/StNet-based algorithm are trained on 3D dimensions for card slots and keypads; (c) monitoring and comparing normal vs. detected constant weights of the keypad as well as weight distribution when keys are depressed are detected; (d) comparing normal vs. disrupted signals based on the foregoing in order to detect unauthorized objects inside, attached to, or in proximity to the ATM; or (e) using NB-IoT LoRa-waves to initiate an alarm process and provide other event-driven functionality.

Additionally and/or more specifically, the solutions contained herein provide improved, real-time, monitoring, control, fraud prevention, and enhanced security for ATMs (including internal/external components thereof) by, inter alia, (a) building an intelligent smart-control mechanism around an ATM that detects, prevents and alert the authorities for a possible infiltration attempts and provides for automatic local shutdown or remotely triggered shutdown; (b) uses LoRa-wave based scanning system installed with intelligent detection system based on combined technology algorithms of DCNN & StNet technology (or the like) to detect ATM scamming, skimming, shimming, fraud, etc.; (c) implementing LoRa-Wave based sensing that constantly scans the ATM slot as well as the keypad and sends back signals to internal sensor(s) for analysis; (d) analyzing rebounded signal patterns for normal or disrupted signals, which could indicate suspicious activity; (e) using disrupted signals to alarm skimming, indicate illegitimate card insertion, identify that a keypad is faulted with a fake keypad, etc.; (f) utilizing sensor(s) infused with DCNN and StNet based algorithm that is trained on card slot dimension, keypad dimension, and keypad weight; (g) using a transparent laser guided system to scan and send back the received signal to the laser tracking system to create a 3D image of the ATM slot in case there is a change in regular dimension and probable detection of fake card being operated through an outside keypad hacking device; (h) utilizing an DCNN and StNet based algorithm to check the dimension and weight of the keypad which is interpreted to determine if there is a keypad attachment put on an original keypad to capture a PIN by the scammer, which can trigger a weight sensor; (i) continuously detecting keypad weight and whether it is distributed evenly or unevenly since the placement of the weight is normally at the center for all keys in order to determine if the keypad is being operated by a human directly or is there a keypad on top of it coupled with the weight distribution; (j) initiating NB-ioT waves signal to start the alarming process if the sensor is triggered; (k) triggering automatic alarm system with the help of LoRa-wave signals that automatically transmit threat signals to nearby authorities for further action and automatic shutdown of the ATM; and/or (l) uniquely combining IoT and DCNN & StNET algorithm system design for advanced geometrical 3D imaging concepts to constantly scan and train the sensor on unique card slot dimensions and keypad weight and dimensions to detect illegal processes like card duplication, silicon based sock, keypad infringement to scam the users, etc.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a LoRa-wave sensing information-security process to protect against unauthorized objects on an automated teller machine (ATM) can comprise one or more steps such as, for example: transmitting, by a LoRa modulator using a spread-spectrum modulation technique, a slot chirp signal to an ATM card slot and a keypad chirp signal to an ATM keypad; receiving, by the LoRa modulator, a card-slot signal pattern of the slot-chirp signal rebounding off of the ATM card slot and a keypad signal pattern of the keypad-chirp signal rebounding off the ATM keypad; scanning, by a transparent laser-guided system, the ATM slot; receiving, by the transparent laser-guided system, a received signal rebounded off of the ATM slot; creating, by the transparent laser-guided system based on the received signal, a 3D image of the ATM slot; transmitting, by the LoRa modulator to a sensor, the card-slot signal pattern and the keypad-signal pattern, said sensor infused with a DCNN/StNet-based algorithm trained on three-dimensional (3D) dimensions for the ATM card slot, 3D dimensions of the ATM keypad, and a weight of the ATM keypad; transmitting, by the transparent laser-guided system to the sensor, the 3D image; detecting, by the sensor based on the 3D image as well as the DCNN/StNet-based algorithm, any dimensional change in the ATM slot; detecting, by the sensor, a first frequency-disrupted signal for the card-slot signal pattern if a skimmer is on the ATM card slot and a second frequency-disrupted signal for the keypad-signal pattern if a fake keypad is on the ATM keypad, said first frequency-disrupted signal and said second frequency-disrupted signal based on environmental variances, temp fluctuations, humidity variances, pressure variances, vibration, motion detection, and electrical current drawn from the ATM card slot exceeding a normal usage level; determining, by the sensor, a normal weight of the ATM keypad; determining, by the sensor, a sensed weight of the ATM keypad; detecting, by the DCNN/STNet-based algorithm in the sensor, whether the fake keypad is on the ATM keypad if the sensed weight constantly exceeds the normal weight; determining, by the sensor, a weight distribution for the ATM keypad when a key on the ATM keypad is depressed; detecting, by the DCNN/STNet-based algorithm in the sensor, whether the fake keypad is on the ATM keypad if the weight distribution is distributed equally over the ATM keypad; determining, by the sensor, that the fake keypad is not on the ATM keypad if the weight distribution is unevenly distributed over the ATM keypad; determining, by the sensor, whether a consensus exists that the fake keypad is on the ATM keypad or that the skimmer is on the ATM card slot; and/or triggering, by the sensor if the consensus exists, NB-IoT LoRa-waves to initiate an alarm process, and disabling the ATM.

In some arrangements, a LoRa-wave sensing information-security process to protect against unauthorized objects on an automated teller machine (ATM) can comprise one or more steps such as, for example: transmitting, by a LoRa modulator using a spread-spectrum modulation technique, a slot chirp signal to an ATM card slot and a keypad chirp signal to an ATM keypad; receiving, by the LoRa modulator, a card-slot signal pattern of the slot-chirp signal rebounding off of the ATM card slot and a keypad signal pattern of the keypad-chirp signal rebounding off the ATM keypad; providing, by the LoRa modulator to a sensor, the card-slot signal pattern and the keypad-signal pattern; detecting, by the sensor, a first disrupted signal for the card-slot signal pattern if a skimmer is on the ATM card slot; detecting, by the sensor, a second disrupted signal for the keypad-signal pattern if a fake keypad is on the ATM keypad; and/or disabling, by the comparative analyzer, the ATM if the skimmer or the fake keypad is detected, or otherwise, allowing the ATM to continue to be in service.

In some arrangements, a LoRa-wave sensing information-security process to protect against unauthorized objects on an automated teller machine (ATM) can comprise one or more steps such as, for example: transmitting, by a LoRa modulator using a spread-spectrum modulation technique, a slot chirp signal to an ATM card slot and a keypad chirp signal to an ATM keypad; receiving, by the LoRa modulator, a card-slot signal pattern of the slot-chirp signal rebounding off of the ATM card slot and a keypad signal pattern of the keypad-chirp signal rebounding off the ATM keypad; scanning, by a transparent laser-guided system, the ATM slot; receiving, by the transparent laser-guided system, a received signal rebounded off of the ATM slot; creating, by the transparent laser-guided system based on the received signal, a 3D image of the ATM slot; transmitting, by the LoRa modulator to a sensor, the card-slot signal pattern and the keypad-signal pattern, said sensor infused with a DCNN/StNet-based algorithm trained on three-dimensional (3D) dimensions for the ATM card slot, 3D dimensions of the ATM keypad, and a weight of the ATM keypad; transmitting, by the transparent laser-guided system to the sensor, the 3D image; detecting, by the sensor based on the 3D image as well as the DCNN/StNet-based algorithm, any dimensional change in the ATM slot; detecting, by the sensor, a first disrupted signal for the card-slot signal pattern if a skimmer is on the ATM card slot; detecting, by the sensor, a second disrupted signal for the keypad-signal pattern if a fake keypad is on the ATM keypad; and/or and disabling, based on the sensor, the ATM if the skimmer or the fake keypad is detected, or otherwise, allowing the ATM to continue to be in service.

In some arrangements, a LoRa Wave and NB-IoT wave based scanning system is infused with the technology of DCNN and StNet to defend ATMs against card slot and keypad duplication based scamming, which is becoming more problematic as scammers are utilizing artificial card slot duplication as well as keypad duplication processes to retrieve the user's key details while they are operating the ATMs.

In the context of this disclosure, DCNN generically refers to deep convolutional neural networks and are used to identify patterns in images and video. DCNNs have evolved from traditional artificial neural networks, using a three-dimensional neural pattern inspired by the visual cortex of animals.

In the context of this disclosure, StNet refers, more generally speaking, to three-dimensional structural interpretation, which is currently utilized for subsurface characterization and exploration, among other similar activities. For the purpose of recognizing particular seismic features, a great deal of existing interpretation methodology has been developed. It is possible to make use of a seismic texture network, also known as StNet, which allows for the automated recognition, classification, and interpretation of patterns derived from three-dimensional seismic and structural data. The construction of a preliminary seismic texture and structural dataset is the first step in the workflow. StNet is able to make use of the most recent developments in the architecture of fully convolutional neural networks and train itself using the data set that was constructed. Interpreters are able to quickly identify the significant seismic and structural features simultaneously from a seismic volume or structure thanks to StNet's demonstrated capability of automatically recognizing and annotating defined seismic and structural patterns in real time. StNet's capabilities have been demonstrated through extensive testing. In addition, StNet can be used to derive more task-oriented networks, such as a neural network for fault detection, which can be extremely useful. StNet is helpful in the context of various aspects of this disclosure as an automated process for machine cognitive data analysis that has broad applications in detecting and analyzing structures. StNet was developed by Microsoft Research and is called StNet.

In some configurations of this disclosure, when a user approaches the ATM, the moment they insert their card, the LoRa Wave based sensor quickly scans the slot dimensions to analyze it for a potential dimension change in the slot if any, after which the weight sensor can senses the weight distribution based on keypad punching by the user to understand and analyze the probability of an keypad duplication. The moment these patterns happen, LoRa Wave signals are transmitted to the sensor which detects whether the signal is disrupted or a normal signal wave. If there is a detected change in the slot dimension and if there is inappropriate weight or weight distribution, then a threat may exist and actions can be taken.

If a threat is detected, a transparent laser guided system scans the slot again sending the signal back to the laser tracking system instilled within where in the algorithm creates a 3D image of the ATM slot which is analyzed by the algorithm to understand change in the dimension of the ATM slot, based on a calculated probability by the algorithm if the confidence level is more than 95% or another suitable threshold there is a high chance of card duplication mechanism in place to scam and based on which again the keypad is scanned in the same way by the transparent laser guided system which checks and scans the keypad for dimension and weight distribution through a weight sensor, once the user presses it, the signal is sent back to the sensor for the algorithm to understand and analyze the weight distribution of the keys pressed as well as the dimension of the keypad, if the weight is evenly distributed, based on trained algorithm it checks and senses if it evenly distributed\, confidence level is checked and if it more than 95% or as desired along with changes in the dimension, there is a high chance that the ATM is under skimming attack and consensus is received that it is a threat. With the help of NB-IoT wave-based system, the sensor is triggered and an alarm shuts down the entire ATM at once and the automatic alarming system with the help of NB-IoT waves notifies the nearby authorities of the threat signals for a potential threat and skimming of the ATM to take further action and catch the skimmer. If both parameters are not met, the sensor may understand it as a no threat and ATM is allowed to function normally.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the processes of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 2 depicts an external view and external components of an exemplary ATM that has potentially been breached with a skimmer or the like.

DETAILED DESCRIPTION

Figure 1:
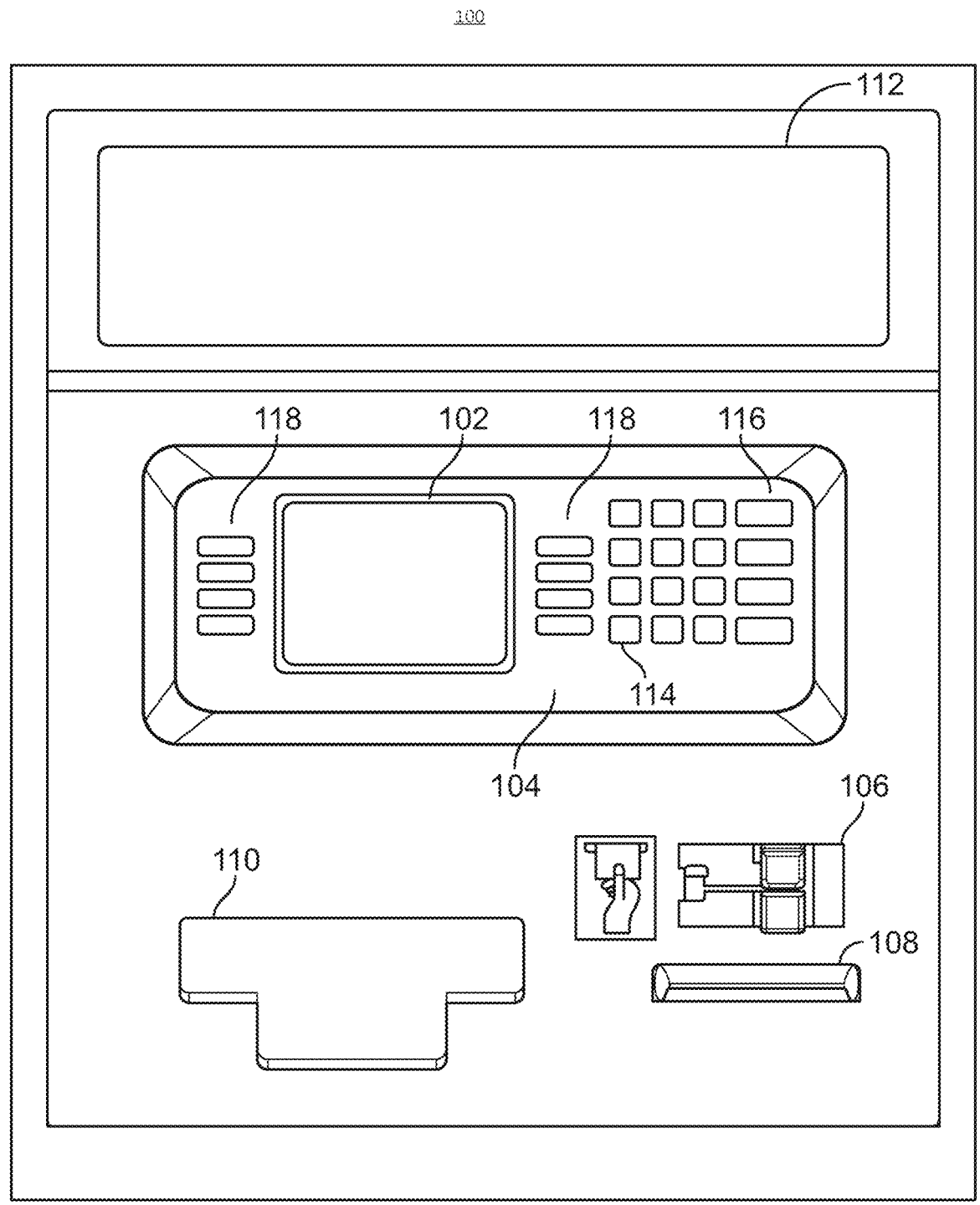
FIG. 1 depicts an external view and external components of an exemplary ATM.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting example, FIG. 1 depicts an external view and external components of an exemplary ATM that is internally modified in accordance with the disclosures contained herein. FIG. 1 shows examples of externally visible components taken from a conventional ATM. One such illustration can be found in U.S. Pat. No. 9,984,538. Monitor 102, keypad 104, card reader port 106, acceptor 108, item dispenser 110, and security screen 112 are all possible components of an automated teller machine. It is possible for Monitor 102 to communicate with a user using either visual or audio information. The user may be able to enter numerical and textual information using the keypad 104, which may include alphanumeric keys 114. Control keys 116 could be included on the keypad 104. The control information, such as instructions, that you need to communicate to the self-service device can be sent via the control keys 116. It's possible that the keypad 104 has some soft keys 118. The user is informed of the functions that soft keys 118 may have by using information that may be displayed on monitor 102. These functions may be predetermined by the programming of the system.

The front end of any card reader that is suitable can be plugged into card reader port 106. The card reader has the capability of reading information that is magnetically encoded on transaction instruments such as bank cards. A contactless chip reader, a wireless transceiver, or any other interface that is deemed suitable for exchanging transaction information with a transaction instrument may be included in the automated teller machine. A chip, an RFID tag, a smart card, a tablet, a smartphone, or any other device that is suitable may serve as the transaction instrument.

The automated teller machine might have a biometric sensor (not shown). A user could be recognized by the biometric sensor based on a distinguishing trait, such as an anatomical feature, that is unique to that user. For instance, the biometric sensor may be programmed to identify the user based on all or part of a face, a fingerprint, an iris, a retina, a hand, or any other suitable anatomical feature. Similarly, the sensor may be programmed to identify the user based on any other suitable anatomical feature. A behavioral feature, such as a signature, a voice, a gait, or any other suitable behavioral characteristic, may be used by the biometric sensor to identify the user. Other behavioral characteristics may also be used.

Acceptor 108 is able to take almost any suitable physical object. For instance, acceptor 108 is able to take in envelops, deposit slips, bills, and checks, in addition to any other appropriate documents. It's possible that Acceptor 108 feeds documents into a scanner, which then digitizes them for image-based transaction processing. Item dispenser 110 may dispense items. For instance, item dispenser 110 may dispense various forms of currency. Bills that have not been collected by a user of device 100 can be retracted by item dispenser 110. The visual input from a surveillance device may be screened by security screen 112. (not shown). It is possible for the surveillance device to provide video information about people who are present close to the self-service device as well as the conditions that are present there. It is possible for the surveillance device to pick up on the fact that there is motion in the area around device 100.

Figure 2:
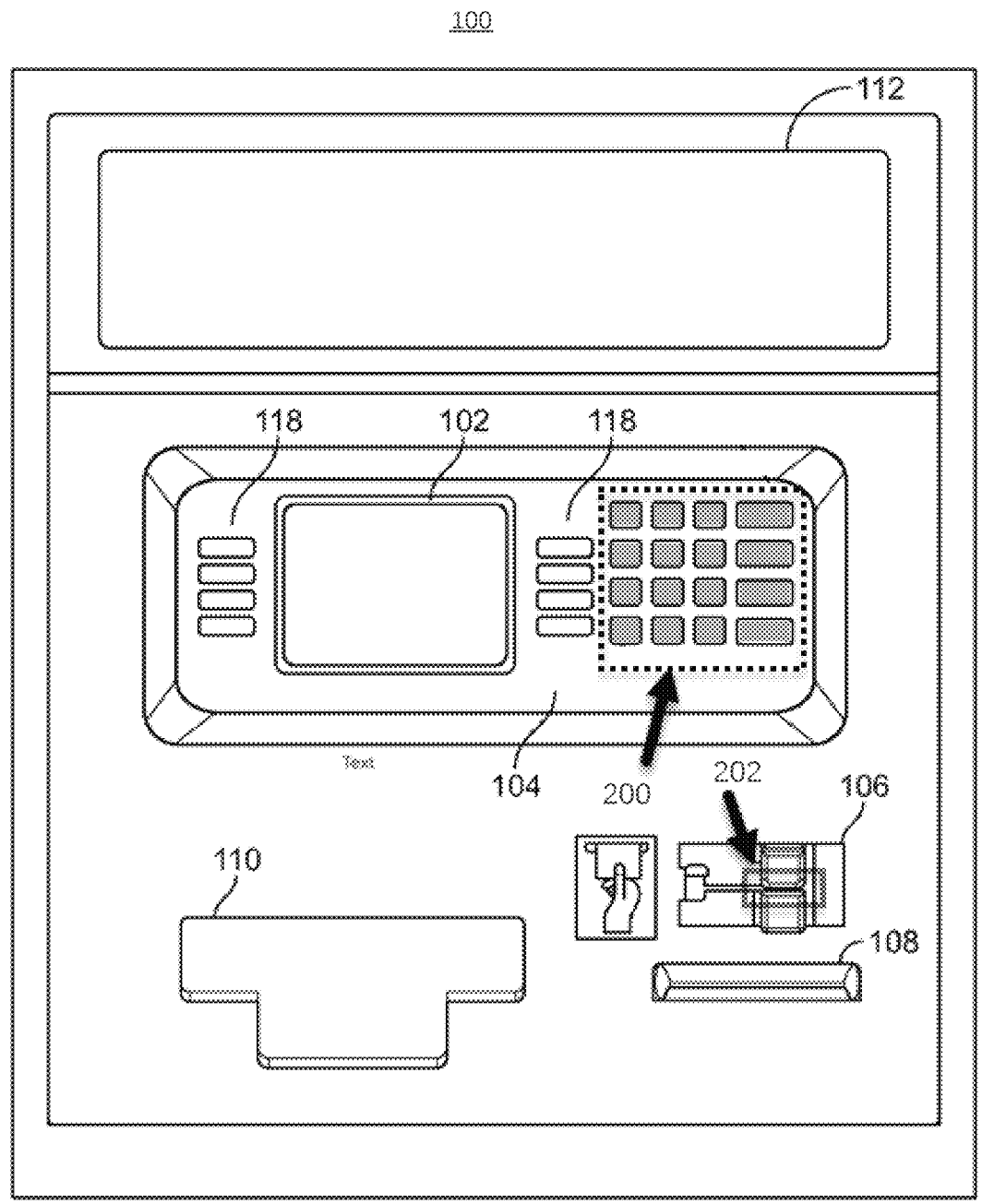

By way of non-limiting example, FIG. 2 depicts an external view and external components of an exemplary ATM that has potentially been breached with a skimmer or the like. In particular, keypad overlay 200 is positioned overtop of authentic keypad 114. The fake keypad 200 is likely undetectable to the user thus necessitating the security aspects of this disclosure. Likewise, a skimmer 202 is in, on, or around the card slot 106 in order to capture the text, magnetic strip, and/or other card indicia or security information.

Figure 3:
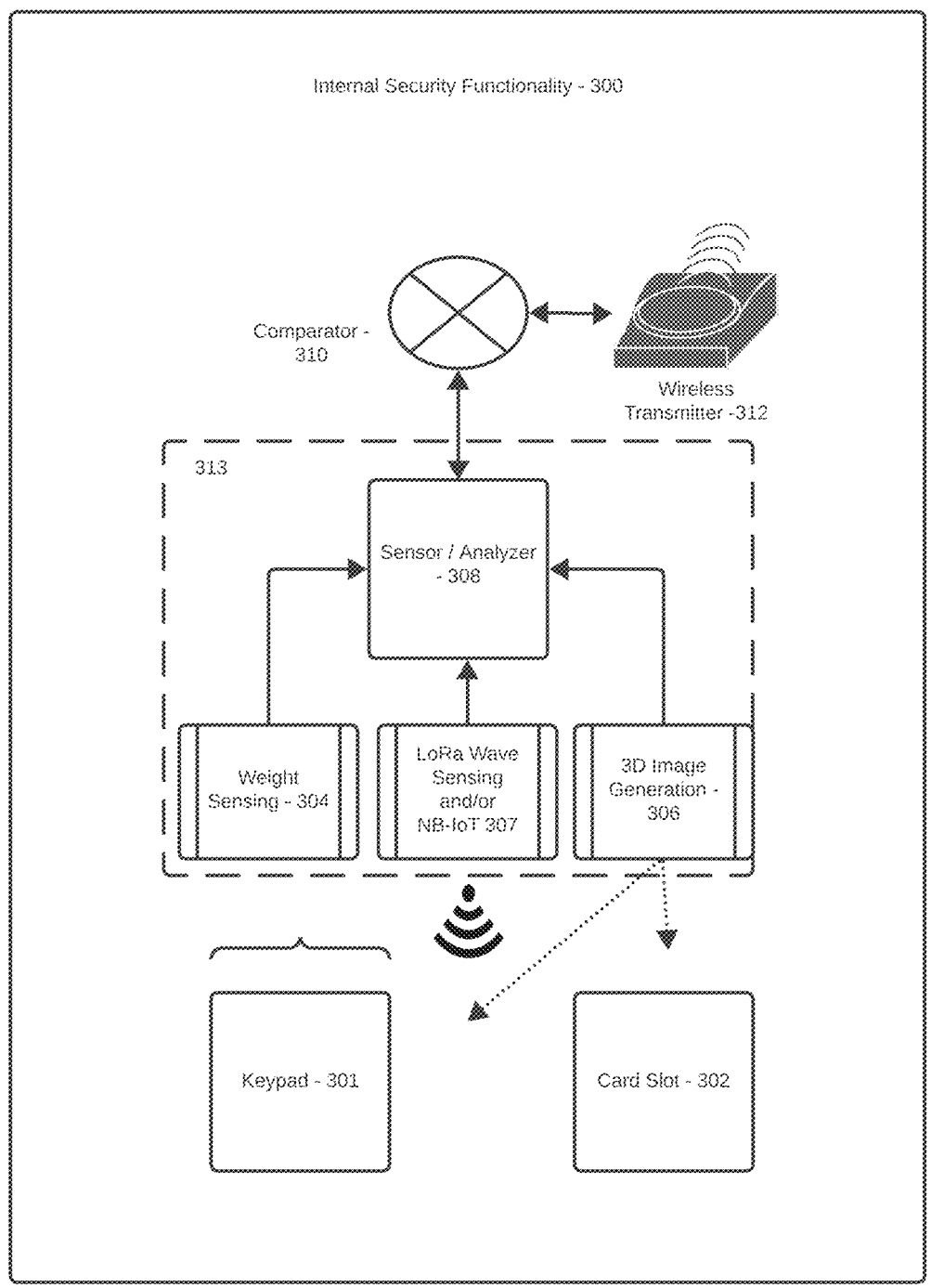
FIG. 3 depicts an internal generalized view with sample applicable exemplary ATM components in accordance with one or more information-security aspects of this disclosure as they relate to detecting unauthorized objects in/on/around the ATM.

By way of non-limiting example, FIG. 3 depicts an internal generalized view with sample applicable exemplary ATM components in accordance with one or more information-security aspects of this disclosure as they relate to detecting unauthorized objects in/on/around the ATM.

The internal security functionality 300 of an ATM in accordance with the disclosure contained herein can include a LoRa Wave and NB-IoT wave based scanning system 307 is infused with the technology of DCNN and StNet to defend ATMs against card slot and keypad duplication based scamming, which is becoming more problematic as scammers are utilizing artificial card slot duplication as well as keypad duplication processes to retrieve the user's key details while they are operating the ATMs.

When a user approaches the ATM, the moment they insert their card into the card slot 302, the LoRa Wave based sensor 307 can quickly scans the slot dimensions to analyze it for a potential dimension change in the slot 302 if any, after which the weight sensor or sensing functionality 304 can senses the weight distribution based on keypad 301 punching by the user to understand and analyze the probability of an keypad duplication or fake key overlay. The moment these patterns happen, LoRa Wave signals are transmitted to the sensor/analyzer 308 which detects whether the signal is disrupted or a normal signal wave has been generated. If there is a detected change in the slot dimension and if suspect/inappropriate/uneven weight or weight distribution is sensed, then a threat may exist and actions can be taken.

If a threat is detected, a transparent laser guided system or 3D image generation functionality 306 can scan the slot 302 again sending the signal back to the laser tracking system instilled within where in the algorithm creates a 3D image of the ATM slot which is analyzed by the algorithm in system/ functionality 306 or sensor/analyzer 308 to understand change in the dimension of the ATM slot 302, based on a calculated probability by the algorithm if the confidence level is more than 95% or another suitable threshold there is a high chance of card duplication mechanism in place to scam and based on which again the keypad 301 can be scanned in the same way by the transparent laser guided system or like functionality 306 which checks and scans the keypad for dimension and weight distribution through a weight sensor or sensing functionality 304. Once the user presses a key, the signal is sent back to the sensor 304, 307, 306, or 308 for the algorithm to understand and analyze the weight distribution of the keys pressed as well as the dimension of the keypad, if the weight is evenly distributed, based on trained algorithm it checks and senses if it evenly distributed confidence level is checked and if it more than 95% or as desired along with changes in the dimension, there is a high chance that the ATM is under skimming attack and consensus is received that it is a threat. With the help of NB-IoT wave-based system 307 or 312, the sensor 308 is triggered and an alarm shuts down the entire ATM at once and the automatic alarming system with the help of NB-IoT waves 312 notifies the nearby authorities of the threat signals for a potential threat and skimming of the ATM to take further action and catch the skimmer. If both parameters are not met based on comparative analysis of signals received and analyzed by comparator 310, the sensor 308 may understand it as a no threat and ATM is allowed to function normally. Importantly, the foregoing functionality of sensing, analyzing, generating images, detecting pressure/weight, observing any vibrations, humidity, or any other such security activities may be implemented separately as individual components to access and monitor the keypad 301 and/or card slot 302, or may be implemented with combination components with one or more combined functionality. Similarly, the internal functionality may be provided by one or more additional components not shown. A POSITA will understand that the particular signal paths and interconnections will change depending on the precise implementation desired. All are considered with the scope and content of this disclosure as they relate to all aspects of sensing and monitoring of the keypad 301 and card slot 302 as well as what to do with the sensed information in order to perform the security analysis.

Figure 4:
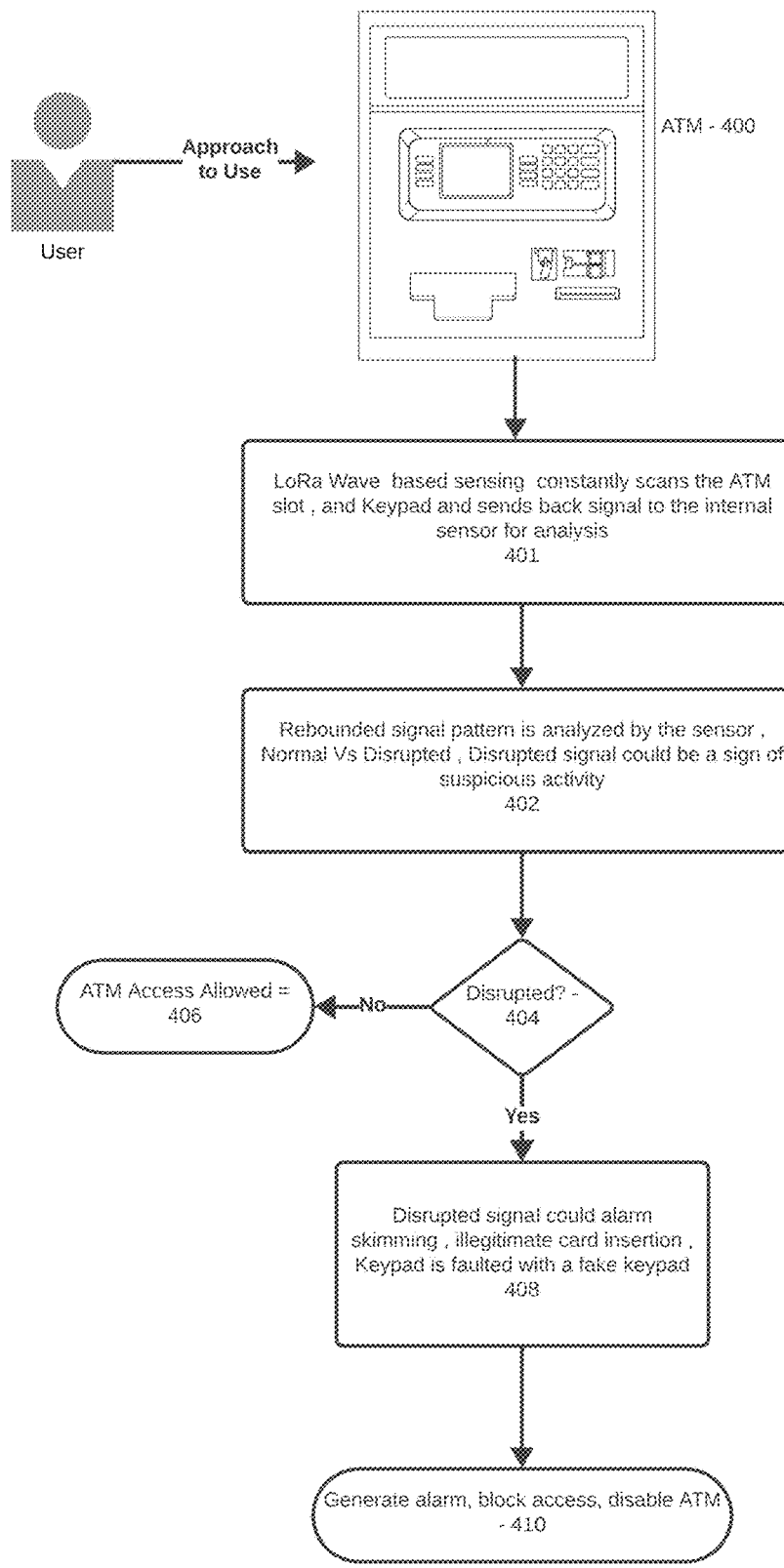
FIG. 4 depicts an exemplary functional, flow diagram showing sample interactions, interfaces, steps, functions, and components for system of detecting unauthorized objects in/on/around the ATM in accordance with one or more information-security aspects of this disclosure.

By way of non-limiting example, FIG. 4 depicts an exemplary functional, flow diagram showing sample interactions, interfaces, steps, functions, and components for system of detecting unauthorized objects in/on/around the ATM in accordance with one or more information-security aspects of this disclosure.

A user approaches ATM 400 and inserts a card into the ATM card slot. The LoRa wave based sensing, which can be sent periodically/constantly/or on demand scan the ATM slot and keypad, and then send back to the internal sensor the signals detected so that they can be analyzed in 401. The rebounded signal pattern can be analyzed by the sensor. The signal can be evaluated and compared against normal signal(s)/signal pattern(s) to determine if there is a match or if the signal is disrupted in 402. If disrupted 402, this could be a sign of suspicious activity. The disrupted signal could provide an alarm indicating skimming, illegitimate card insertion, keypad fault, fake keypad, etc. in 408. This could result in generating alarm(s), blocking access, disabling the ATM, etc. in 410. Or, if there was no disrupted signal, normal ATM access can be allowed in 406.

Figure 5:
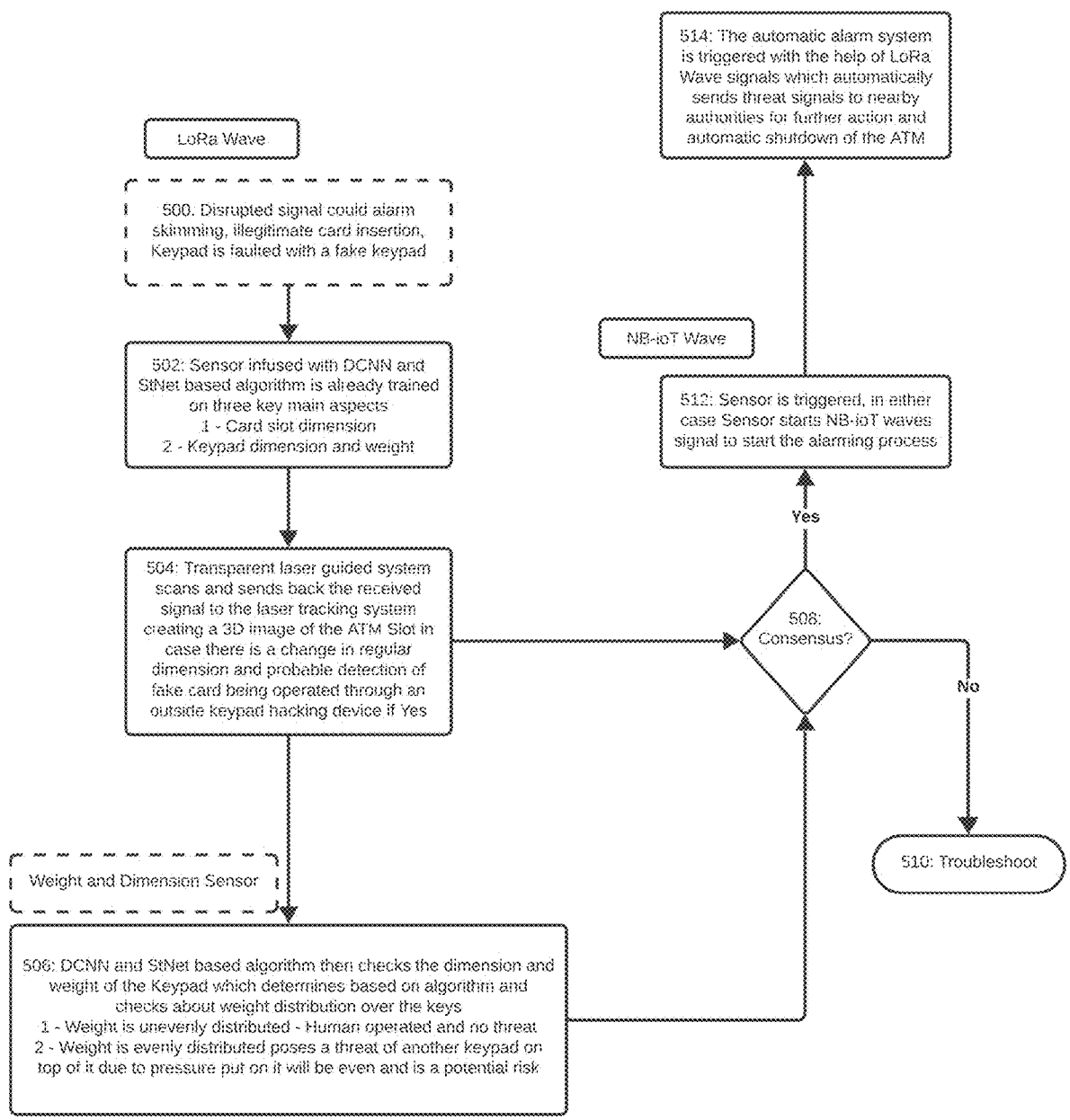
FIG. 5 depicts a further exemplary functional, flow diagram showing sample interactions, interfaces, steps, functions, and components for system of detecting unauthorized objects in/on/around the ATM in accordance with one or more information-security aspects of this disclosure.

By way of non-limiting example, FIG. 5 depicts a further exemplary functional, flow diagram showing sample interactions, interfaces, steps, functions, and components for system of detecting unauthorized objects in/on/around the ATM in accordance with one or more information-security aspects of this disclosure.

LoRa wave sensing can be used in 500 to detect skimming, illegitimate card insertion, etc. The sensor that receives the signal can be infused with DCNN and StNet based algorithm that is already trained on aspects of the card slot and keypad in 502. This can include 3D card slot dimensions and structural orientations, keypad dimensions, keypad weight, normal keypad pressure distribution when individual keys are depressed by a human, etc.

In 504, a transparent laser guided system can scan and send back the received signal to create a 3D image of the slot in case there is a change in regular dimension that may indicate detection of a fake card being operated through an outside keypad hacking device 504.

In 506, the DCNN and StNet based algorithm then checks the dimension and weight of the keypad as well as the distribution of pressure/weight on the keypad and/or individual keys as depressed. If the weight is unevenly distributed such as, for example, when a user presses an individual key on the pad, the keypad operation is likely normal and there is no problem. Conversely, if the weight is evenly distributed such as when a flat fake keypad may be placed over the entire ATM keypad, this may indicate a potential risk.

In 508, the sensors/analyzers/comparators can evaluate the various signals to indicate whether there is a consensus of a problem or a consensus that there is no problem. Alternatively, a lack of consensus may indicate that troubleshooting may need to be performed in 510.

If there is a consensus of a problem, a sensor can be triggered and NB-IoT waves may be generated to start an alarming or other event driven process or actions in 512.

In 514, the automatic alarm system may be triggered with the help of LoRa wave signals that automatically send threat signals to nearby authorities or operators for further action and/or automatic local or remote shutdown of the ATM or network access.

Figure 6:
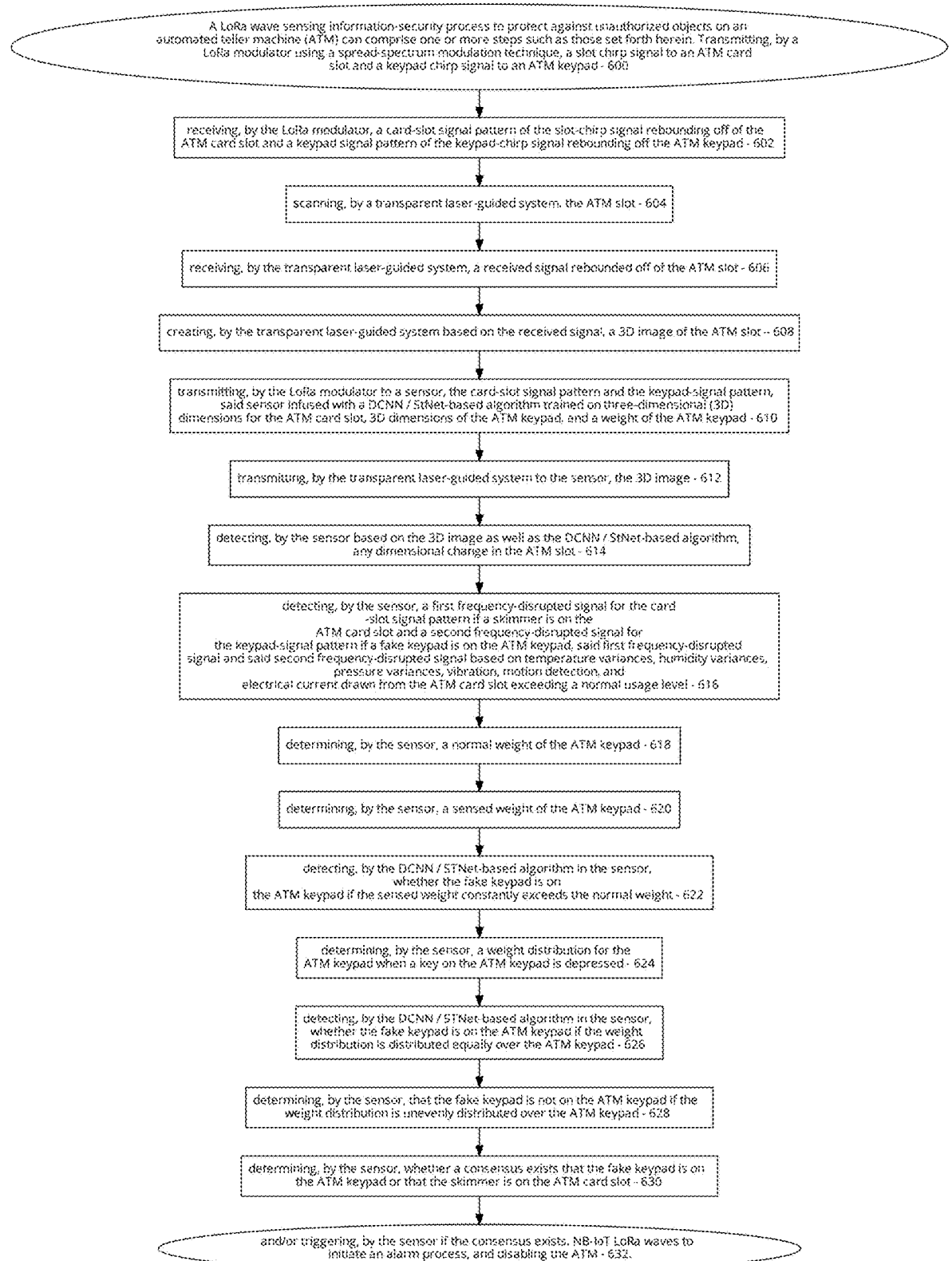
FIG. 6 depicts a sample exemplary functional, flow diagram showing sample interactions, interfaces, steps, functions, and components for system of detecting unauthorized objects in/on/around the ATM in accordance with one or more information-security aspects of this disclosure.

By way of non-limiting example, FIG. 6 depicts a sample exemplary functional, flow diagram showing sample interactions, interfaces, steps, functions, and components for system of detecting unauthorized objects on the ATM in accordance with one or more information-security aspects of this disclosure.

A LoRa-wave sensing information-security process to protect against unauthorized objects on an automated teller machine (ATM) can comprise one or more steps such as those set forth herein. Transmitting, by a LoRa modulator using a spread-spectrum modulation technique, a slot chirp signal to an ATM card slot and a keypad chirp signal to an ATM keypad—600; receiving, by the LoRa modulator, a card-slot signal pattern of the slot-chirp signal rebounding off of the ATM card slot and a keypad signal pattern of the keypad-chirp signal rebounding off the ATM keypad—602; scanning, by a transparent laser-guided system, the ATM slot—604; receiving, by the transparent laser-guided system, a received signal rebounded off of the ATM slot—606; creating, by the transparent laser-guided system based on the received signal, a 3D image of the ATM slot—608; transmitting, by the LoRa modulator to a sensor, the card-slot signal pattern and the keypad-signal pattern, said sensor infused with a DCNN/StNet-based algorithm trained on three-dimensional (3D) dimensions for the ATM card slot, 3D dimensions of the ATM keypad, and a weight of the ATM keypad—610; transmitting, by the transparent laser-guided system to the sensor, the 3D image—612; detecting, by the sensor based on the 3D image as well as the DCNN/StNet-based algorithm, any dimensional change in the ATM slot—614; detecting, by the sensor, a first frequency-disrupted signal for the card-slot signal pattern if a skimmer is on the ATM card slot and a second frequency-disrupted signal for the keypad-signal pattern if a fake keypad is on the ATM keypad, said first frequency-disrupted signal and said second frequency-disrupted signal based on temperature variances, humidity variances, pressure variances, vibration, motion detection, and electrical current drawn from the ATM card slot exceeding a normal usage level—616; determining, by the sensor, a normal weight of the ATM keypad—618; determining, by the sensor, a sensed weight of the ATM keypad—620; detecting, by the DCNN/STNet-based algorithm in the sensor, whether the fake keypad is on the ATM keypad if the sensed weight constantly exceeds the normal weight—622; determining, by the sensor, a weight distribution for the ATM keypad when a key on the ATM keypad is depressed—624; detecting, by the DCNN/STNet-based algorithm in the sensor, whether the fake keypad is on the ATM keypad if the weight distribution is distributed equally over the ATM keypad—626; determining, by the sensor, that the fake keypad is not on the ATM keypad if the weight distribution is unevenly distributed over the ATM keypad—628; determining, by the sensor, whether a consensus exists that the fake keypad is on the ATM keypad or that the skimmer is on the ATM card slot—630; and/or triggering, by the sensor if the consensus exists, NB-IoT LoRa-waves to initiate an alarm process, and disabling the ATM—632.

Figure 7:
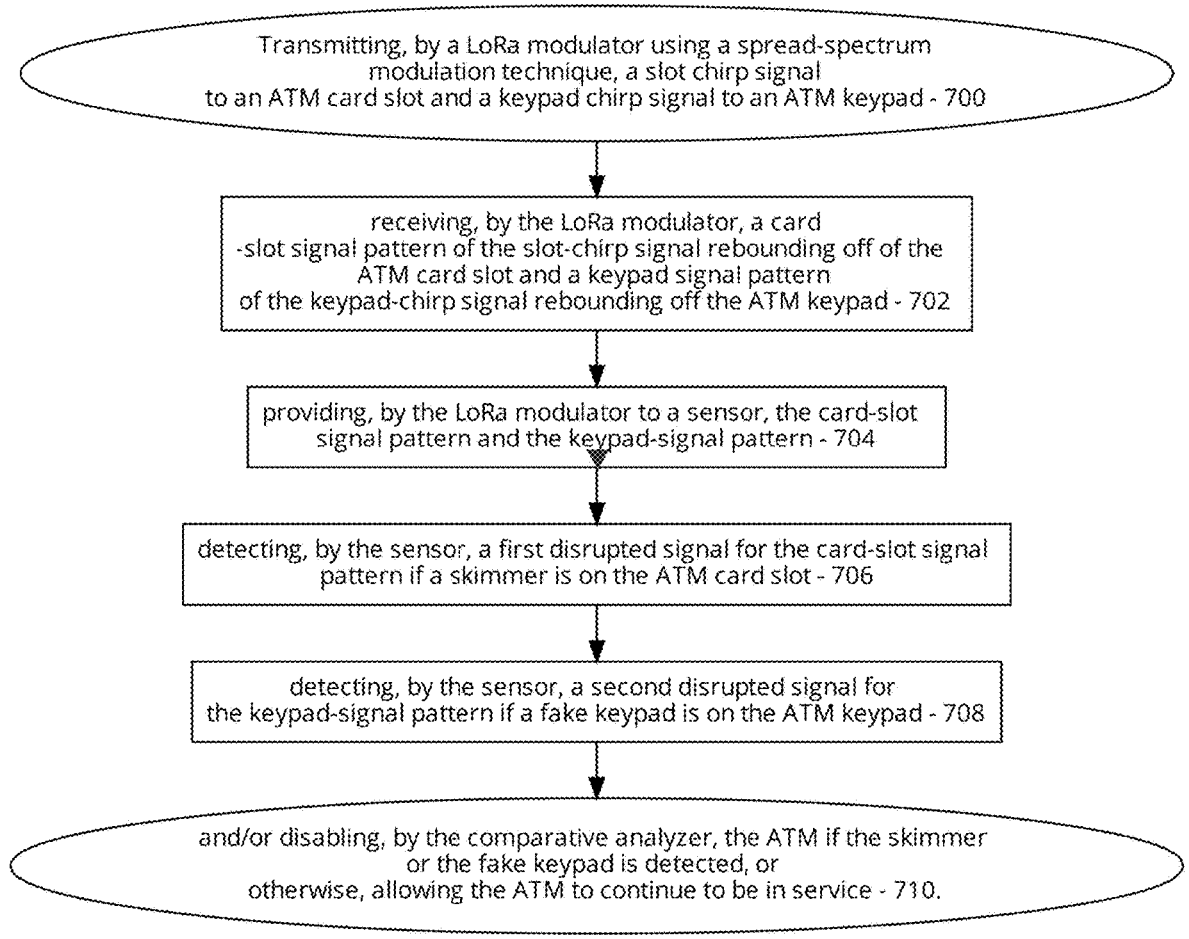
FIG. 7 depicts a further sample exemplary functional, flow diagram showing sample interactions, interfaces, steps, functions, and components for system of detecting unauthorized objects in/on/around the ATM in accordance with one or more information-security aspects of this disclosure.

By way of non-limiting example, FIG. 7 depicts a further sample exemplary functional, flow diagram showing sample interactions, interfaces, steps, functions, and components for system of detecting unauthorized objects on the ATM in accordance with one or more information-security aspects of this disclosure. A LoRa-wave sensing information-security process to protect against unauthorized objects on an automated teller machine (ATM) can comprise one or more steps such as, for example, the following. Transmitting, by a LoRa modulator using a spread-spectrum modulation technique, a slot chirp signal to an ATM card slot and a keypad chirp signal to an ATM keypad—700; receiving, by the LoRa modulator, a card-slot signal pattern of the slot-chirp signal rebounding off of the ATM card slot and a keypad signal pattern of the keypad-chirp signal rebounding off the ATM keypad—702; providing, by the LoRa modulator to a sensor, the card-slot signal pattern and the keypad-signal pattern—704; detecting, by the sensor, a first disrupted signal for the card-slot signal pattern if a skimmer is on the ATM card slot—706; detecting, by the sensor, a second disrupted signal for the keypad-signal pattern if a fake keypad is on the ATM keypad—708; and/or disabling, by the comparative analyzer, the ATM if the skimmer or the fake keypad is detected, or otherwise, allowing the ATM to continue to be in service—710.

Skilled artisans will recognize that any number of additional process flows and/or combinations of the same may be implemented consistent with the various arrangements described throughout this application. Hence further flow diagrams would be superfluous to the written descriptions and explanations already provided.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for detecting unauthorized objects on an automated teller machine (ATM), comprising:
   transmitting, by a LoRa modulator, spread-spectrum modulation signals to a card slot and a keypad of the ATM;
   receiving, by the LoRa modulator, rebounded signal patterns from the card slot and the keypad;
   analyzing, by a sensor infused with a trained algorithm, the rebounded signal patterns to detect any disruptions indicative of unauthorized objects;
   scanning, by a transparent laser-guided system, the ATM card slot to generate a three-dimensional image;
   analyzing, by the trained algorithm, the three-dimensional image for dimensional changes in the ATM card slot;
   detecting, by the sensor, weight distribution and pressure patterns on the ATM keypad during use;
   identifying, by the trained algorithm, anomalies in the weight distribution or pressure patterns indicative of unauthorized keypad overlays;
   determining, by a consensus analysis, the presence of unauthorized objects on or within the ATM based on signal disruptions, dimensional changes, or anomalous weight distribution; and
   triggering, by the sensor, an alarm process that includes disabling the ATM and notifying authorities upon detecting unauthorized objects.

2. The method of claim 1, wherein the trained algorithm comprises a deep convolutional neural network (DCNN) trained on three-dimensional (3D) dimensions of the ATM card slot and keypad.

3. The method of claim 2, wherein the algorithm further incorporates a structural interpretation network (StNet) to analyze patterns in the three-dimensional image for detecting unauthorized objects.

4. The method of claim 3, wherein the analysis includes comparing detected signal patterns with predefined normal signal patterns to determine disruptions caused by unauthorized objects.

5. The method of claim 4, wherein disruptions in signal patterns are detected based on environmental variances, including temperature, humidity, vibration, motion, and pressure.

6. The method of claim 5, wherein the step of analyzing the weight distribution on the keypad includes detecting whether the weight is evenly or unevenly distributed across the keys during user interaction.

7. The method of claim 6, wherein an evenly distributed weight indicates the presence of an unauthorized keypad overlay.

8. The method of claim 7, further comprising generating a confidence score for detecting unauthorized objects based on dimensional changes, signal disruptions, and weight distribution analysis.

9. The method of claim 8, wherein an alarm process is triggered when the confidence score exceeds a predefined threshold.

10. The method of claim 9, wherein the alarm process includes disabling the ATM to prevent further unauthorized access.

11. The method of claim 10, wherein the alarm process further includes transmitting threat notifications to authorities or a central monitoring system using NB-IoT communication.

12. The method of claim 11, wherein the transmitted notifications include real-time data on the detected unauthorized object and its location.

13. The method of claim 12, wherein the transparent laser-guided system generates the three-dimensional image by analyzing rebounded signals from multiple angles.

14. The method of claim 13, wherein the method further comprises continuously monitoring the ATM card slot and keypad to detect unauthorized objects in real time.

15. The method of claim 14, wherein the continuous monitoring is performed periodically, on demand, or based on user interaction with the ATM.

16. A system for detecting unauthorized objects on an automated teller machine (ATM), comprising:
   a LoRa modulator configured to transmit spread-spectrum modulation signals to a card slot and a keypad of the ATM and to receive rebounded signal patterns therefrom;
   a transparent laser-guided system configured to scan the ATM card slot and generate a three-dimensional image;

a sensor infused with a trained algorithm, the algorithm comprising a deep convolutional neural network (DCNN) and a structural interpretation network (StNet), configured to analyze the rebounded signal patterns and the three-dimensional image to detect dimensional changes in the ATM card slot and disruptions in signal patterns indicative of unauthorized objects;

a weight sensor configured to detect the weight distribution and pressure patterns on the ATM keypad during user interaction;

a consensus analysis module configured to determine the presence of unauthorized objects based on signal disruptions, dimensional changes, or anomalous weight distribution; and a control module configured to initiate an alarm process, including disabling the ATM and transmitting notifications to authorities, upon determining the presence of unauthorized objects.

17. The system of claim 16, wherein the trained algorithm in the sensor is configured to detect disruptions in signal patterns based on environmental variances, including temperature, humidity, pressure, vibration, and motion.

18. The system of claim 17, wherein the weight sensor is further configured to analyze the distribution of weight on the ATM keypad to distinguish between normal user interaction and the presence of an unauthorized keypad overlay.

19. The system of claim 18, wherein the control module is further configured to transmit real-time threat notifications, including details of the detected unauthorized object and its location, to a central monitoring system or authorities using NB-IoT communication.

20. The system of claim 19, wherein the system continuously monitors the ATM card slot and keypad periodically, on demand, or based on user interaction, and evaluates environmental variances, including temperature, humidity, pressure, vibration, and motion, to detect signal disruptions indicative of unauthorized objects.

\* \* \* \* \*